US006076238A

United States Patent [19]
Arsenault et al.

[11] Patent Number: 6,076,238
[45] Date of Patent: Jun. 20, 2000

[54] MECHANICAL FASTENER

[75] Inventors: Cathleen M. Arsenault, Fridley; Brian T. Hargrett, St. Paul; James J. Kobe, Newport; Leon Levitt, Mendota Heights, all of Minn.

[73] Assignee: 3M Innovative Properties Company, St. Paul, Minn.

[21] Appl. No.: 09/290,750

[22] Filed: Apr. 13, 1999

[51] Int. Cl.⁷ .............................. F16B 5/00; A44B 18/00
[52] U.S. Cl. ............................................... 24/452; 24/442
[58] Field of Search .............................. 24/306, 442–452

[56] References Cited

U.S. PATENT DOCUMENTS

| | | | |
|---|---|---|---|
| 3,101,517 | 8/1963 | Fox et al. | 24/204 |
| 3,266,113 | 8/1966 | Flanagan, Jr. | 24/204 |
| 3,408,705 | 11/1968 | Kayser et al. | 24/204 |
| 3,899,805 | 8/1975 | McMillan | 24/213 |
| 4,180,890 | 1/1980 | Brumlik | 24/451 X |
| 4,198,734 | 4/1980 | Brumlik | 24/451 X |
| 4,290,174 | 9/1981 | Kalleberg | 24/204 |
| 4,290,832 | 9/1981 | Kalleberg | 156/72 |
| 4,322,875 | 4/1982 | Brown et al. | 24/204 |
| 4,984,339 | 1/1991 | Provost et al. | 24/452 |
| 5,040,275 | 8/1991 | Eckhardt et al. | 24/447 |
| 5,077,870 | 1/1992 | Melbye et al. | 24/452 |
| 5,103,546 | 4/1992 | Rossini et al. | 29/450 |
| 5,179,767 | 1/1993 | Allan | 24/442 |
| 5,212,853 | 5/1993 | Kaneko | 24/452 |
| 5,242,646 | 9/1993 | Torigoe et al. | 264/219 |
| 5,607,635 | 3/1997 | Melbye et al. | 264/169 |
| 5,625,929 | 5/1997 | Hattori et al. | 24/452 |
| 5,671,512 | 9/1997 | Hattori et al. | 24/452 |
| 5,761,775 | 6/1998 | Legome et al. | 24/442 X |
| 5,792,411 | 8/1998 | Morris et al. | 264/400 |

FOREIGN PATENT DOCUMENTS

| | | |
|---|---|---|
| 0 565 750 A1 | 10/1993 | European Pat. Off. . |
| 0 793 923 A1 | 9/1997 | European Pat. Off. . |
| 74 08635 | 10/1975 | France . |
| 94/23610 | 10/1994 | WIPO . |
| 98/14086 | 4/1998 | WIPO . |
| 98/30381 | 7/1998 | WIPO . |

*Primary Examiner*—James R. Brittain
*Assistant Examiner*—Robert J. Sandy

[57] ABSTRACT

A mechanical fastener including a plurality of engaging stems located in unordered arrangements, which repeat on a substrate. A preferred embodiment of the invention provides a mechanical fastener with a plurality of repeating unordered arrangements, where the arrangements repeat in more than one direction. The unordered arrangements of the engaging stems allow pairs of the fasteners to interengage with themselves, or in other words, to self-mate. Additionally, the unordered arrangements of engaging stems allow the fasteners to interengage at any relative angular orientation with a relatively constant engagement force, and a relatively constant disengagement force regardless of their angular orientation. The unordered arrangements of engaging stems also allow pairs of fasteners to interengage at any relative planar position with a relatively constant engagement force and a relatively constant disengagement force regardless of their planar position.

40 Claims, 4 Drawing Sheets

MECHANICAL FASTENER

TECHNICAL FIELD

The present invention relates generally to a mechanical fastener. The present invention relates more particularly to a mechanical fastener that includes a plurality of stems located in unordered arrangements, which repeat on a substrate.

BACKGROUND OF THE INVENTION

Various types of mechanical fasteners are known for holding articles together, such as hook and loop type fasteners or complementary pairs of fasteners that engage with one another. The complementary pairs of fasteners typically have functional surfaces with headed stems with heads for engaging the two fasteners together. The engaging stems are located in ordered positions relative to one another on a substrate. The patterns usually consist of straight rows of equally spaced engaging stems. Examples of fasteners with straight rows of engaging stems are U.S. Pat. No. 3,101,517, "Fastener," (Fox et al.) and U.S. Pat. No. 4,290,174, "Separable Fastener and Article for Making Same" (Kalleberg). When the fasteners are engaged, the stems of each resiliently deflect to allow the heads to enter the space between the adjacent stems of the other fastener.

It has also been know that straight rows of engaging stems may allow the individual fasteners to move relative to each other in a direction parallel to the rows of the fasteners, also referred to as shear slip. As a result, improved ordered patterns of engaging stems were developed to decrease the probability of the fasteners moving in the shear direction. Examples of fasteners with such ordered patterns are U.S. Pat. No. 5,625,929 "Interengaging Fastener Member," (Hattori et al.) and U.S. Pat. No. 5,040,275, "Strip Material Used for Forming Fasteners," (Eckhardt et al.).

U.S. Pat. No. 3,408,705, "Fastener Articles," (Kayser et al.), discusses fasteners comprising pairs of unitary interengaging articles. Each article has a base carrying a multiplicity of headed engaging elements over its surface. The positions of the element heads are unordered with respect to each other. This lack of order makes the engagement force of the articles much more uniform at all relative angles and positions of engagement than if the elements were ordered.

Figure 1:
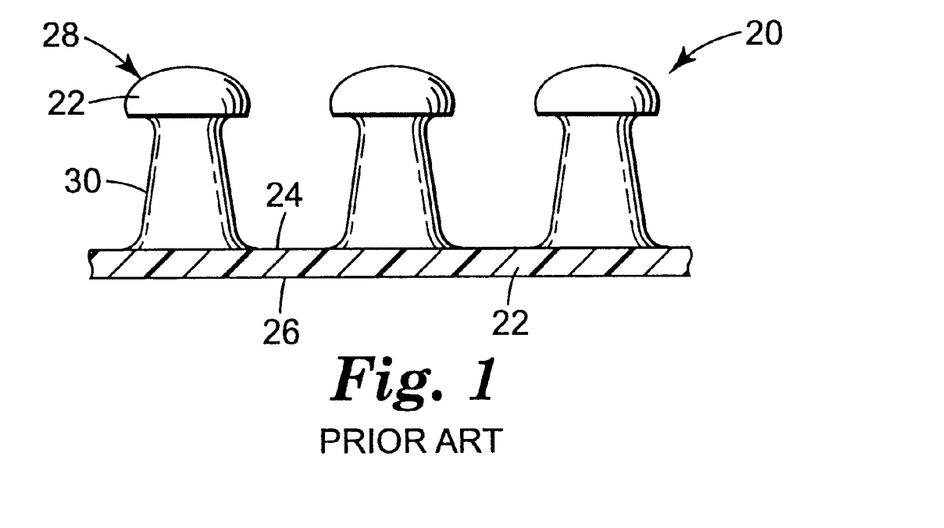
FIG. 1 is a side view of a typical prior art mechanical fastener.

FIG. 1 is an example of a prior art mechanical fastener 19. Mechanical fastener 19 includes a substrate 22 and a plurality of engaging stems 28 extending from the substrate 22 in an ordered arrangement. The substrate 22 includes a first major surface 24 and a second major surface 26 opposite the first major surface 24. The engaging stems 28 extend from the first major surface 24 of the substrate 22. The engaging stems include a stem 30 and a head 32 on the stem 30 opposite the first major surface 24 of the substrate. Typically, the ordered arrangement of the engaging stems 28 is an arrangement of a plurality of lateral and longitudinal rows of engaging stems 28 on the substrate 22. Mechanical fastener 19 is designed to engage with loop material or interengage with another mechanical fastener of the same or compatible design, as shown in FIG. 2.

Figure 2:
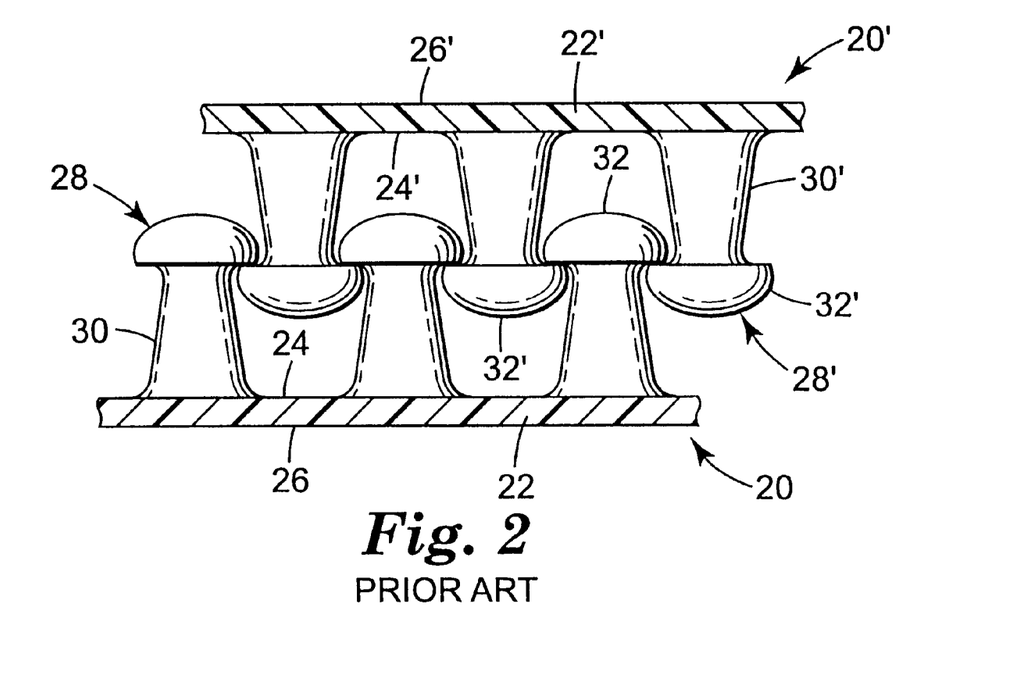
FIG. 2 is a side view of a pair of the prior art mechanical fasteners of FIG. 1 interengaged with one another.

FIG. 2 illustrates a pair of the mechanical fasteners 19, 19' of FIG. 1 interengaged with one another. Due to the ordered spacing of the engaging stems 28, the pair of fasteners 19, 19' must be first aligned such that the heads 32' of fastener 19' are positioned over the space between adjacent engaging stems 28 of fastener 20. Next, the fasteners 19, 19' are pushed together, slipping the heads 32' of mechanical fastener 19' between adjacent stems 30 of mechanical fastener 19 thereby engaging with the heads 32 of the adjacent stems 30. Typically, the engaging stems 28, 28' of fasteners 19, 19' are flexible to allow for the slippage of the heads 32, 32' between adjacent stems 28, 28'. As a result, the mechanical fasteners 19, 19' interengage and are held in place by their respective engaging heads 32, 32'.

SUMMARY OF THE INVENTION

One aspect of the present invention provides a mechanical fastener. The mechanical fastener comprises a substrate, a plurality of engaging stems extending from the substrate, and an x-axis and y-axis which are mutually perpendicular to each other. The stems are arranged in a plurality of repeating arrangements, where the stems within each of the arrangements are unordered, and the arrangements repeat in more than one direction. In one preferred embodiment of the fastener, the location of each of the plurality of engaging stems in the arrangement is ordered relative to one another along the x-axis. In another preferred embodiment of the fastener, the location of each of the plurality of engaging stems in the arrangement is ordered relative to one another along the y-axis. In another preferred embodiment, the y-distance between adjacent of the plurality of engaging stems in the arrangements is in a pattern of a-a-b. In yet another aspect of this embodiment, a<b.

In another preferred embodiment of the above fastener, the plurality of repeating arrangements are ordered relative to one another along the x-axis. In another aspect of this embodiment, the x-distance between adjacent of the plurality of repeating arrangements includes at least two different x-distances. In another aspect of this embodiment, the x-distance between adjacent of the plurality of repeating arrangements is in a pattern of A-B-C-B. In yet another aspect of this embodiment, the plurality of repeating arrangements are ordered relative to one another along the y-axis.

In another preferred embodiment of the above fastener, the plurality of repeating arrangements are ordered relative to one another along the y-axis. In another preferred embodiment of the above fastener, the fastener is an interengaging mechanical fastener. Another aspect of this embodiment includes a pair of the interengaging mechanical fasteners, where the pair of fasteners are capable of interengaging at relative angular orientations.

Another aspect of the present invention provides an alternative mechanical fastener. The mechanical fastener comprises a substrate, a plurality of engaging stems extending from the substrate, and an x-axis and a y-axis which are mutually perpendicular to each other. The stems are arranged in a plurality of repeating arrangements, where the stems within each of the arrangements are unordered where the location of each of the engaging stems in the arrangements is ordered relative to one another along the y-axis. In one preferred embodiment of the fastener, the y-distance between adjacent of the plurality of engaging stems is in a pattern of a-a-b. In another aspect of this embodiment, a<b.

In another preferred embodiment of the above fastener, the plurality of repeating arrangements are ordered relative to one another along the x-axis. In another aspect of this embodiment, the x-distance between adjacent of the plurality of repeating arrangements includes at least two different x-distances. In another aspect of this embodiment, the x-distance between adjacent of the plurality of repeating arrangements is in a pattern of A-B-C-B. In yet another preferred embodiment of the above fastener, the plurality of repeating arrangements are ordered relative to one another along the y-axis. In another preferred embodiment of the above fastener, the fastener is an interengaging mechanical fastener. Another aspect of this embodiment includes a pair of interengaging mechanical fasteners, where the pair of fasteners are capable of interengaging at relative angular orientations.

Another aspect of the present invention provides an alternative mechanical fastener. The mechanical fastener comprises a substrate, a plurality of engaging stems extending from the substrate and an x-axis and y-axis which are mutually perpendicular to each other. The stems are arranged in a plurality of repeating arrangements, the plurality of repeating arrangements are ordered relative to one another along the x-axis, and the x-distance between adjacent of the plurality of repeating arrangement includes at least two different x-distances. In another preferred embodiment of the above fastener, the x-distance between adjacent of the plurality of repeating arrangements includes at least three different x-distances. In another aspect of this embodiment, the x-distance between adjacent of the plurality of repeating arrangements is in a pattern of A-B-C-B. In another aspect of this embodiment, A>B. In yet another aspect of this embodiment, B>C.

In another preferred embodiment of the above fastener, the plurality of repeating arrangements are ordered relative to one another along the y-axis. In yet another preferred embodiment of the above fastener, the arrangements repeat in more than one direction. In another preferred embodiment of the above fastener, the location of each of the engaging stems in the arrangements is unordered. In another preferred embodiment of the above fastener, the location of each of the engaging stems in the arrangement is ordered relative to one another along the y-axis. In yet another preferred embodiment of the above fastener, where the location of each of the plurality of engaging stems in the arrangement is ordered relative to one another along the x-axis. In another aspect of this embodiment, the fastener is an interengaging mechanical fastener. In another aspect of this embodiment includes a pair of fasteners, where the pair of fasteners are capable of interengaging at relative angular orientations.

In yet another aspect of the present invention provides a pair of mechanical fasteners. The pair of interengaging mechanical fasteners comprises a substrate, a plurality of engaging stems, extending from the substrate and an x-axis and a y-axis which are mutually perpendicular to each other. The stems are arranged in a plurality of repeating arrangements, where the stems within each of the arrangements are unordered. In a preferred embodiment of the fasteners, the location of each of the plurality of engaging stems in the arrangements is ordered relative to one another along the x-axis. In another preferred embodiment of the fasteners, the location of each of the engaging stems in the arrangements is ordered relative to one another along the y-axis. In another aspect of this embodiment, the y-distance between adjacent of the plurality of engaging stems is in a pattern of a-a-b. In another aspect of this embodiment, a<b.

In another preferred embodiment of the above fasteners, the plurality of repeating arrangements are ordered relative to one another along the x-axis. In another aspect of this embodiment, the x-distance between adjacent of the plurality of repeating arrangements includes at least two different x-distances. In another aspect of this embodiment, the x-distance between adjacent of the plurality of repeating arrangements is in a pattern of A-B-C-B. In yet another preferred embodiment of the above fasteners, the plurality of repeating arrangements are ordered relative to one another along the y-axis. In another preferred embodiment of the above fasteners, the arrangements repeat in more than one direction. In another aspect of this embodiment, the fasteners are capable of interengaging at relative angular orientations.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

The present invention provides a mechanical fastener that includes a plurality of stems in which the stems are located in unordered arrangements which repeat on a substrate. The arrangements of the engaging stems allow a pair of the fasteners to interengage, i.e., to self-mate. Additionally, the arrangements of engaging stems allow a pair of fasteners to interengage at any relative planar position or any relative angular orientation with a relatively constant engagement force and a relatively constant disengagement force regardless of their planar position or angular orientation.

Figure 3:
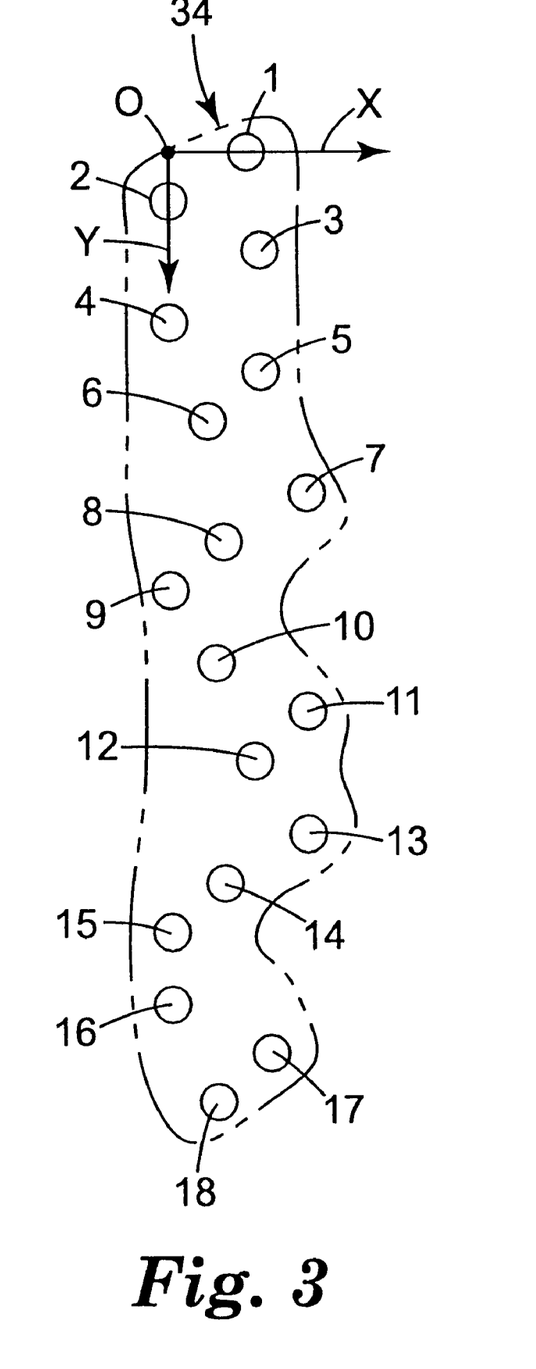
FIG. 3 is a schematic plan view of a preferred unordered arrangement of the engaging stems of the present invention.

FIG. 3 illustrates a schematic view indicating where the engaging stems 28 are located for a preferred unordered arrangement of the present invention. The positions of the engaging stems 28 are denoted as a circle in this view of the fastener 20. The circles represent the position of the engaging stems 28, not the size or shape of the engaging stems 28. Engaging stems 28 may be in any desired shape, size or form. First unordered arrangement 34 includes an x-axis and y-axis, which are mutually perpendicular to each other. Origin 0 is located at the intersection of the x-axis and y-axis. The x-axis, y-axis and origin are convenient for describing the location of individual engaging stems 28 in the arrangement 34. Additionally, the x-axis, y-axis and origin are convenient for describing the locations of individual arrangements of engaging stems 28 relative to one another in the mechanical fastener 20. (See FIG. 4.)

In FIG. 3, the first arrangement 34 is an example of an unordered arrangement of engaging stems 28. Arrangement 34 is illustrated as including eighteen individual stems. However, it is understood that any number of engaging stems 28 may be included in the repeating arrangement. The term "unordered" as used to describe the present invention, refers to the relative positions of the engaging stems on a mechanical fastener and indicates that the positions of the engaging stems 28 are mathematically unpredictable relative to each other. This mathematical unpredictability means even if the location of one or any number of the engaging stems 28 is known, this information cannot be used to determine the location of any other engaging stems 28. There are three ways of obtaining an unordered pattern of engaging stems 28. For a given number of stems 28, the x-positions of the engaging stems 28 may be unordered, the y-positions of the engaging stems 28 may be unordered, or both the x-positions and y-positions of the engaging stems 28 may be unordered. In contrast, typical prior art fasteners, such as those discussed in the background, include ordered arrangements of stems. By ordered it is meant both the x-position and y-positions of the stems are ordered. In other words, the x-positions of the engaging stems 28 are mathematically predictable relative to one another and the y-positions of the engaging stems 28 are mathematically predictable relative to one another. Table 1 below illustrates the ordered arrangements of engaging stems versus the three types of unordered arrangements of engaging stems in the present invention:

TABLE 1

| Description of the Arrangements of the Engaging Stems | X-Positions of the Stems Relative to One Another in the Arrangement | Y-Positions of the Stems Relative to One Another in the Arrangement |
| --- | --- | --- |
| Ordered | Ordered | Ordered |
| Unordered | Ordered | Unordered |
| Unordered | Unordered | Ordered |
| Unordered | Unordered | Unordered |

FIG. 3 illustrates an example of an unordered arrangement 34 of engaging stems 28 in which the x-positions of the stems 28 are unordered relative to one another and the y-positions of the stems are ordered relative to one another. One preferable ordered pattern for the y-positions of the stems is where the y-distance between adjacent stems is in a pattern of a-a-b. In one such pattern, preferably a is less than b. In one particular embodiment, the ratio of a to b is 0.68. One example of a preferred spacing is where a equals 18.7 units and b equals 27.5 units. Table 2 below shows the x-position and y-position of all eighteen individual stems and the y-distance between adjacent stems for the unordered arrangement 34 in FIG. 3. The reported positions are measured from the origin O to the center of the stem. The reported distances are measured from the center of one engaging stem 28 to the center of the adjacent engaging stem 28.

TABLE 2

| Stem | X-position | Y-position | Y-distance Between Adjacent Stems |
| --- | --- | --- | --- |
| 1 | 30.0 | 0 | |
| 2 | 0 | 18.7 | 18.7 |
| 3 | 35.0 | 37.4 | 18.7 |
| 4 | 0 | 64.9 | 27.5 |
| 5 | 35.0 | 83.6 | 18.7 |
| 6 | 14.5 | 102.3 | 18.7 |
| 7 | 52.5 | 129.8 | 27.5 |
| 8 | 20.5 | 148.5 | 18.7 |
| 9 | 0 | 167.2 | 18.7 |
| 10 | 17.5 | 194.7 | 27.5 |
| 11 | 52.5 | 213.4 | 18.7 |
| 12 | 32.0 | 232.1 | 18.7 |
| 13 | 52.5 | 259.6 | 27.5 |
| 14 | 20.5 | 278.3 | 18.7 |
| 15 | 0 | 297.0 | 18.7 |
| 16 | 0 | 324.5 | 27.5 |
| 17 | 38.0 | 343.2 | 18.7 |
| 18 | 17.5 | 361.9 | 18.7 |

The numbers above in Table 2 may be in any units. One suitable unit is $10^{-3}$ inches. In one preferred embodiment, Table 2 is read as distances in $10^{-3}$ inches. In this preferred embodiment, the diameter of heads 32 are preferably $22 \times 10^{-3}$ inches ($55.9 \times 10^{-3}$ cm.). Alternatively, the distances in Table 2 may be scaled up or down to form other unordered arrangements. The size of the head 32 can then be selected in light of the spacing to provide the desired engagement and disengagement force.

Figure 4:
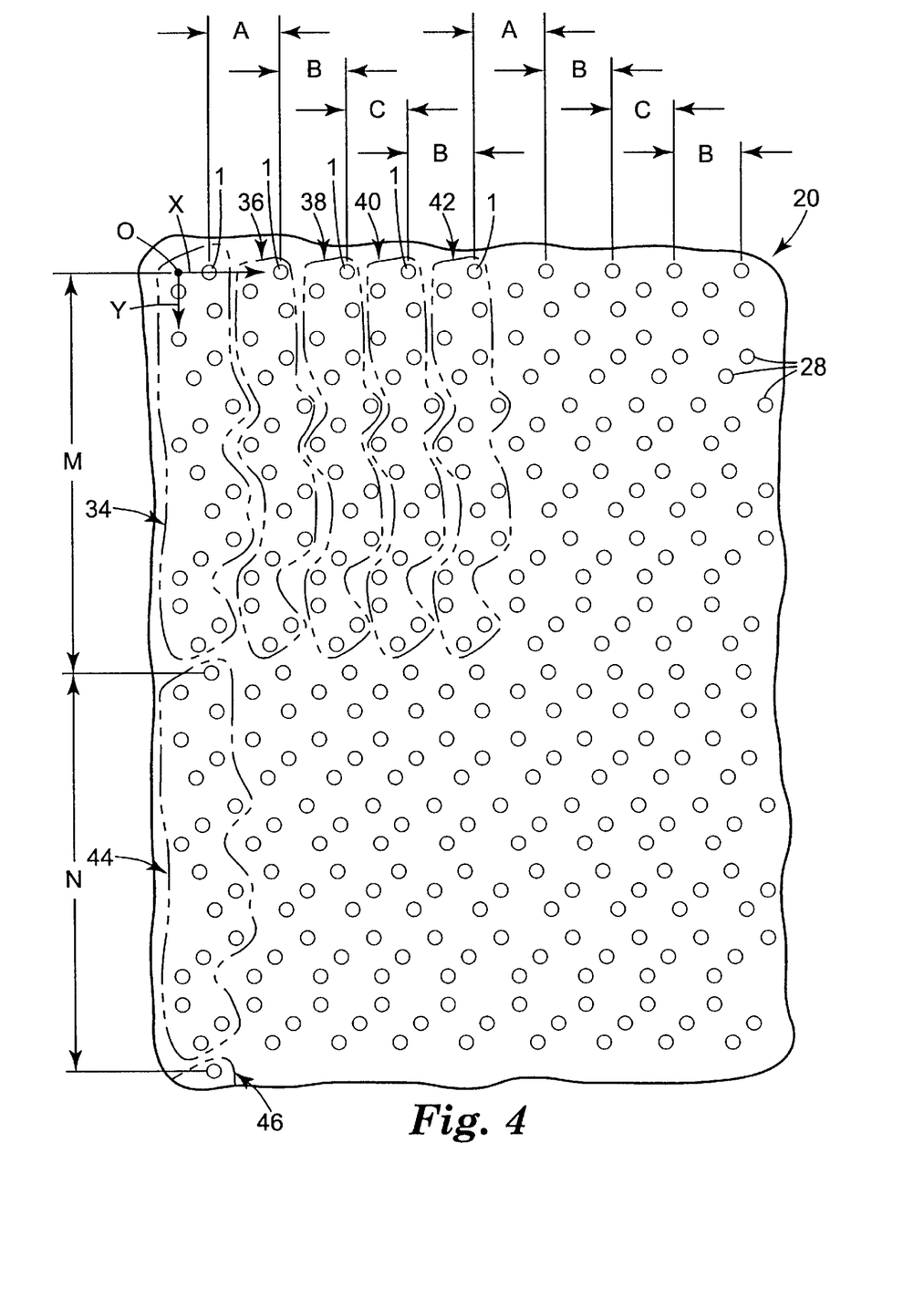
FIG. 4 is a schematic plan view of a mechanical fastener of the present invention including a plurality of unordered arrangements of engaging stems of FIG. 3 in a repeating pattern.

FIG. 4 is a schematic view of a preferred mechanical fastener 20. Fastener 20 includes a plurality of repeating unordered arrangements (34, 36, 38 . . . ) of engaging stems 28. Some of the unordered arrangements are outlined to help illustrate the repeating pattern of arrangements. In this preferred embodiment, each unordered arrangement of engaging stems 28 is identical. That is, the total number of engaging stems 28 and the location of each stem within the arrangement is identical to the next arrangement. For example, first arrangement 34 is identical to the second arrangement 36, which is identical to the third arrangement 38, and so on. However, repeating copies of an unordered arrangement are not required to be adjacent one another. Instead, identical unordered arrangements may repeat every other arrangement or every third or fourth arrangement. (See FIG. 5.)

The unordered arrangements of engaging stems 28 preferably repeat in either or both the x-direction, as illustrated by the first arrangement 34 and the second arrangement 36; and the y-direction, as illustrated by the first arrangement 34 and the sixth arrangement 44. The location of the repeating unordered arrangements relative to one another may be ordered or unordered in either or both of the x-direction or y-direction. The ordered or unordered relationship among the plurality of arrangements is illustrated by measuring the center to center x-distance between the corresponding stems in adjacent arrangements. For example, the center to center x-distance between the first stem 1 in the first arrangement 34 and the first stem 1 in the second arrangement 36 is equal to the x-distance between the second stem 2 in the first arrangement 34 and the second stem 2 in the second arrangement 36.

Preferably, the plurality of unordered arrangements of stems repeat in an ordered pattern in the x-direction. More preferably, the repeating arrangements include at least two different x-distances between adjacent arrangements. In other words, the x-distances between adjacent arrangements include at least two different spacings along the x-axis. In one preferred example, the repeating arrangements include at least 3 different x-distances between adjacent arrangements. One example of an arrangement including at least 3 different x-distances between adjacent arrangements is illustrated in FIG. 4. This example uses a pattern of A-B-C-B for the x-distances between adjacent arrangements. However, any ordered pattern may be used. The reported distances are measured from the center of one engaging stem 28 to the center of the adjacent engaging stem 28. In this example, the x-distance between the first stem 1 in the first arrangement 34 and the first stem 1 in the second arrangement 36 is A. The x-distance between the first stem 1 in the second arrangement 36 and the first stem 1 in the third arrangement 38 is B. The x-distance between the first stem 1 in the third arrangement 38 and the first stem 1 in the fourth arrangement 40 is C. The x-distance between the first stem 1 in the fourth arrangement 40 and the first stem 1 in the fifth arrangement 42 is B. Then, the next set of arrangements repeats along the x-axis with the same pattern, A-B-C-B. In one preferred embodiment, A is greater than B and B is greater than C. In another preferred embodiment, the ratio of A to B equals 1.007 and the ratio of B to C equals 1.083. Table 3 includes a preferred embodiment of values of A, B, and C.

TABLE 3

|   | Preferred Values | Preferred Values |
|---|---|---|
| A | 70 | 82.7 |
| B | 65 | 76.8 |
| C | 60 | 70.9 |

The numbers above in Table 3 may be in any units. In one preferred embodiment, the spacing in Table 3 is in $10^{-3}$ inches. Alternatively, the numbers in Table 3 may be scaled up or down to form other unordered arrangements.

Preferably, the plurality of unordered arrangements of stems also repeats relative to one another in an ordered pattern along the y-axis. The ordered or unordered relationship among the plurality of arrangements along the y-axis is illustrated by measuring the center to center y-distance between the corresponding stems in adjacent arrangements. More preferably, the repeating arrangements include at least two different y-distances between adjacent arrangements. FIG. 4 illustrates one preferred example of repeating arrangements including at least two different y-distances. This example uses a pattern of M-N for the y-distances between adjacent arrangement. However, any ordered pattern may be used. In this example, the y-distance between the first stem 1 in the first arrangement 34 and the first stem 1 in the sixth arrangement 44 is equal to M. The y-distance between the first stem 1 in the sixth arrangement 44 and the first stem 1 in the seventh arrangement 46 is equal to N. However, as mentioned above, the unordered arrangements may also be unordered relative to one another in the y-axis or ordered in a different pattern.

While a preferred embodiment of the mechanical fastener 20 includes unordered arrangements repeating in an ordered fashion relative to one another in both the x-axis and y-axis, it is understood that alternatively, the unordered arrangements may be unordered relative to one another along either or both the x-direction and y-direction. Additionally, it is understood that the repeating unordered arrangements might repeat in directions other than in the general direction of the x-axis and y-axis or may repeat in more than two directions. For example, the repeating unordered arrangements may repeat in a diagonal direction relative to the x-axis or may repeat in three or four different directions. It is understood that a mechanical fastener having "repeating arrangements" includes at least two identical unordered arrangements. However, the two unordered arrangements are not required to be adjacent each other. Instead, the unordered arrangements may be spaced apart from each other with another arrangement of engaging stems located between them and still be considered "repeating arrangements."

Figure 5:
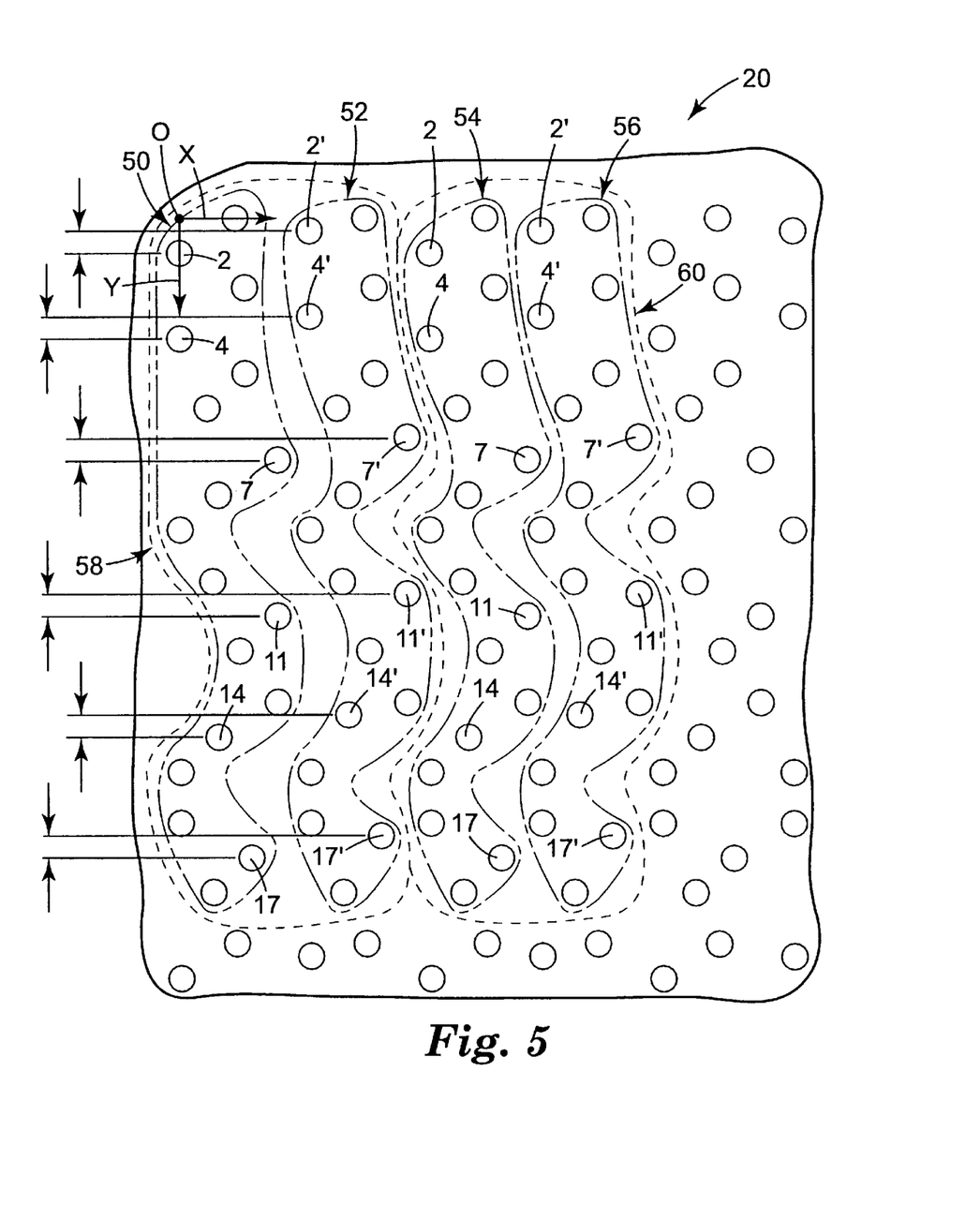
FIG. 5 is a schematic plan view of an alternative mechanical fastener of the present invention including a plurality of unordered arrangements of engaging stems in a repeating pattern.

FIG. 5 is a schematic view of another preferred mechanical fastener 20. Fastener 20 also includes repeating unordered arrangements of engaging stems 28. Some of the unordered arrangements are outlined to help illustrate the repeating pattern of arrangements. The first unordered arrangement 50 of fastener 20 is the same arrangement as the first unordered arrangement 34 in FIG. 3. The second arrangement 52 of fastener 20 includes the same number of engaging stems 28 as the first arrangement 50. However, the locations of stems 2', 4', 7', 11', 14', 17' in the second arrangement 52 have been moved relative to the locations of stems 2, 4, 7, 11, 14, 17 in the first arrangement 50. The third unordered arrangement 54 is a repeat of the first unordered arrangement 50. The fourth unordered arrangement 56 is repeat of the second unordered arrangement 52. Alternatively, fastener 20 could be described as having two copies of a larger repeating unordered arrangement, the fifth arrangement 58 and the sixth arrangement 60, which are adjacent each other. The fifth unordered arrangement includes the thirty-six stems of the first and second unordered arrangements 50, 52. The sixth arrangement 60 includes the thirty-six stems of the fourth and fifth unordered arrangements 54, 56. It is understood that repeating unordered arrangements of engaging stems 28 may include more than two smaller unordered repeating arrangements of engaging stems 28.

Pairs of individual fasteners may be cut from anywhere in the mechanical fasteners 20 of FIG. 4 and FIG. 5. The pairs of individual fasteners 20 may be cut from the same larger fastener 20 or from two separate fasteners 20 that have different arrangements of engaging stems 28 or different densities of stems per unit area. Regardless of what master roll the pair of fasteners are cut from, the unordered arrangements of the engaging stems 28 allow the pair of the fasteners to interengage with themselves, or in other words, to self-mate. Additionally, the unordered arrangements of engaging stems 28 allow the fasteners to interengage at any relative angular orientation with a relatively constant engagement force, and a relatively constant disengagement force regardless of their angular orientation. The relative angular positions of the pair of mechanical fasteners 20 may be varied to as little as a half of a degree and still be capable of interengaging. The unordered arrangements of engaging stems 28 also allow the pair of fasteners 20 to interengage at any relative planar position with a relatively constant engagement force and a relatively constant disengagement force regardless of their planar position. The relative planar positions of the pair of mechanical fasteners 20 may be varied in small increments and still be capable of interengaging.

The unordered positions of the stems in an arrangement minimizes the chance of slippage of the pair of fasteners 20 relative to each other in a direction parallel to substrate 22, referred to as the shear slip. Additionally, the ordered or unordered positions of the arrangements relative to each other along the x-axis and y-axis discourages slippage of the fasteners 20 relative to each other in the shear direction.

The engagement forces required to interengage the fasteners are not necessarily equal to the disengagement forces required to disengaging the fasteners. Preferably, the pair of fasteners requires a stronger force to disengage from each other than the force to engage them. Factors that will affect the engagement and disengagement forces between a pair of fasteners include: the sizes and shapes of the heads 32 of the engaging stems 28, the spacing between adjacent engaging stems 28, the planar area of the heads relative to the planar area of the fastener, the cross-sectional shape of the stems 30, and the overall engaging stem stiffness. These factors may be optimized by one skilled in the art to achieve preferred engagement and disengagement forces for the uses intended for the pair of mechanical fasteners. Alternatively, mechanical fastener 20 may engage with any loop material suitable for hook and loop fasteners.

The schematic views of FIG. 4 and FIG. 5 represent the locations of individual engaging stems 28. Engaging stems 28 may be any desired height, cross section, or head shape. One preferred type of engaging stem is the engaging stem 28 illustrated in FIG. 1, which includes a mushroom shaped head 32 and a stem 30 with a circular cross-section. Preferred heights of the stems 30, measured from the first major surface 24 of substrate 22 to the bottom of the head 32, are in the range of 0.002 to 0.500 in. (0.005 to 1.27 cm.) More preferred heights of the stems 30, measured from the first major surface 24 of substrate 22 to the bottom of the head 32, are in the range of 0.015 to 0.150 in. (0.0381 to 0.381 cm.) Most preferred heights of the stems 30, measured from the first major surface 24 of the substrate 22 to the bottom of the head 32 are in the range of 0.025 to 0.075 in. (0.064 to 0.191 cm.). Preferred heights of the heads 22 of the engaging stems 28, measured from the bottom of the head 32 to the top of the head 32, are in the range of 0.002 to 0.215 in. (0.005 to 0.546 cm.). More preferred heights of the heads 22 of the engaging stems 28, measured from the bottom of the head 32 to the top of the head 32, are in the range of 0.005 to 0.090 in. (0.013 to 0.229 cm.) Most preferred heights of the heads 22 of the engaging stems 28, measured from the bottom of the head 32 to the top of the head 32, are in the range of 0.010 to 0.030 in. (0.025 to 0.076 cm.). Alternatively, the heights of the engaging stems 28 may vary within a single mechanical fastener 20.

Preferred diameters of the stems 30 are in the range of 0.003 to 0.070 in. (0.008 to 0.178 cm.) More preferred diameters of the stems 30 are in the range of 0.005 to 0.025 in. (0.013 to 0.064 cm.) Most preferred diameters of the stems 30 are in the range of 0.008 to 0.016 in. (0.020 to 0.041 cm.). The stems may be cylindrical or tapered. Preferred diameters of the heads 30 at their outermost periphery are in the range of 0.005 to 0.150 in. (0.013 to 0.381 cm.) More preferred diameters of the heads 30 at their outermost periphery are in the range of 0.010 to 0.075 in. (0.025 to 0.191 cm.) Most preferred diameters of the heads 30 at their outermost periphery are in the range of 0.018 to 0.030 in. (0.046 to 0.076 cm.).

The head density of fastener 20 is equal to the planar area occupied by heads 32 divided by the total area of the substrate 22. The head density may be selected based on the desired use. Preferably, the head density is selected such that engagement between a pair of fasteners 20 is possible, yet there is a sufficient density so that strong engagement is achieved. The head density for fastener 20 is preferably in the range of 14% to 45%. More preferably, the head density is in the range of 20% to 40%. Most preferably, the head density is in the range of 30% to 35%.

The number of engaging stems 28 in a given area may be any number, selected based on the desired use for the fastener 20 and the size of the engaging stems. One preferred density of engaging stems is in the range of 7 to 22959 stems/inch$^2$ (1 to 3560 stems/cm$^2$). A more preferred density of engaging stems is in the range of 198 to 1768 stems/inch$^2$ (31 to 274 stems/cm$^2$). A most preferred density of engaging stems is in the range of 285 to 804 stems/inch$^2$ (44 to 125 stems/cm$^2$). The stiffness of the engaging stems 28 is related to the diameter, height, and material of the stem 28. For stem diameters in the range of 0.012 to 0.016 in. (0.030 to 0.041 cm) and stem heights the range of 0.015–0.051 in. (0.038 to 0.0130 cm.) the flexural Modulus is preferably in the range of 25,000 to 2,000,000 psi (172,250 to 13,780,00 kPa). For a stem diameter of 0.014 in. (0.0356 cm) and a stem height of 0.037 in. (0.094 cm.) a more preferred flexural Modulus is approximately 200,000 psi (1,378,000 kPa).

Mechanical fasteners 20 may be manufactured in any way known to those skilled in the art. The present invention is concerned with the location and arrangement of the engaging stems 28. The size, shape, and manufacturing technique are not critical and can be selected as desired by one skilled in the art. One suitable method of manufacturing the mechanical fastener is disclosed in PCT publication WO 98/57564 (Kampfer), published on Dec. 23, 1998. This publication generally discloses a method of forming stems on a substrate using a preselected thermoplastic resin. The resin is fed by conventional means into an extruder, which melts the resin and moves the heated resin to a die. The die extrudes the resin as a wide ribbon of material onto a mold surface, such as a cylinder having an array of mold cavities in the form of elongated holes. The elongated holes may be located to provide the arrangement of stems in the present invention, for example by drilling the cylinder. Preferably, the elongated holes are tapered to facilitate removal of the solidified resin from the mold cavities. These holes or mold cavities are preferably in the form of straight (i.e., only one axis in the length direction) cavities. The mold cavities can be connected to a vacuum system to facilitate resin flow into the mold cavities. This could require a doctor blade or knife to remove excess material extruded into the interior face of the mold cylinder. The mold cavities preferably terminate in the mold surface having an open end for entry of the liquid resin and a closed end. In this case, a vacuum could be used to partially evacuate the mold cavities prior to entering the die. The mold surface preferably matches that of the die where they are in contact to prevent excess resin being extruded out, e.g., the die side edges. The mold surface and cavities can be air or water cooled, or the like, prior to stripping the integrally molded substrate and upstanding formed stems from the mold surface such as by a stripper roll. This provides a substrate having integrally formed stems of thermoplastic material. The stems are then headed. One suitable method for heading the stem is U.S. Pat. No. 5,077,870, Melbye et al. Another suitable method of manufacturing a mechanical fastener is disclosed in co-pending application "A Mechanical Fastener and Method of Making the Same," U.S. patent application Ser. No. 09/290,751, Attorney Docket No. 54696USA7A, filed on the same date herewith.

The mechanical fastener 20 of the present invention can be produced in long, wide webs that can be wound up as rolls for convenient storage and shipment. The mechanical fastener material in such rolls can optionally have a layer of pressure-sensitive adhesive on the surface of the substrate opposite that with the engaging stems. Pieces of desired sizes of mechanical fastener can be cut from the roll of fastener material and adhesively or otherwise secured to articles to permit releasable attachment of an article to a second article or substrate.

As previously stated, the mechanical fastener 20 of the present invention can be engaged with itself, with the engaging stems of another mechanical fastener, or with a loop structure. The fastener of the invention can be used wherever hook and loop or headed stem fasteners are currently used such as for automotive, electronic, marine, transportation, point of purchase, and automotive aftermarket uses. For example, the mechanical fastener of the invention is useful for attachments such as an abrasive disk to a backup pad, access panels, automotive trim, seat covers, headliners, computer monitor covers, carpet, wall decorations, pictures, signage, and displays; closures such as envelopes, mailers, boxes, and pouches; and assemblies such as cell phones, computer printers, office furniture, office panels, toys, and picture frames.

Preferably, the substrate 22 and the engaging stems 28 are integrally molded. Substrate 22 and engaging stems 28 may be made of any thermoplastic resin. Suitable thermoplastic resins include polyesters such as poly(ethylene terephthalate), polyamides such as nylon, poly(styrene-acrylonitrile), poly(acrylonitrile-butadiene-styrene), polyolefins such as polypropylene, polyethylene, polyurethanes, and plasticized polyvinyl chlorides. The thermoplastic resin may also comprise blends, including polypropylene and polyethylene blends. Copolymers of the foregoing resins can also be used. A preferred thermoplastic resin is a propylene polymer resin such as those available under the trade names Phillips HGZ-180 and Phillips HGX-030-01 from Phillips Sumika Polypropylene Company, Houston, Tex.

The substrate 22 and engaging stems 28 may also include one or more additives, including, but not limited to, powders such as fumed silica, talc, or clay; magnetic, electrically conductive, thermally conductive, electrically and thermally conductive, or nonconductive particulates; fibers; glass or polymeric hollow microspheres, glass or polymeric solid microspheres, expandable polymeric microspheres, antistatic agents, lubricants, wetting agents, flow control agents, tackifying resins, surfactants, pigments, dyes, colorants, coupling agents, plasticizers, and antioxidants.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A mechanical fastener, comprising:
   a) a substrate; and
   b) a plurality of engaging stems extending from said substrate, wherein said stems are arranged in a plurality of repeating arrangements, wherein said stems within each of said arrangements are positioned in an unordered pattern, wherein said arrangements each having said unordered pattern repeat in more than one direction and wherein said fastener includes an x-axis and a y-axis which are mutually perpendicular to each other.

2. The mechanical fastener of claim 1, wherein said engaging stems within said arrangements are ordered relative to one another along said x-axis.

3. The mechanical fastener of claim 1, wherein said engaging stems within said arrangements are ordered relative to one another along said y-axis.

4. The mechanical fastener of claim 3, wherein adjacent of said plurality of engaging stems in said arrangements have a spacing along said y-axis in a pattern of a-a-b.

5. The mechanical fastener of claim 4, wherein a is less than b.

6. The mechanical fastener of claim 1, wherein said plurality of repeating arrangements are ordered relative to one another along said x-axis.

7. The mechanical fastener of claim 6, wherein the x-distance between adjacent of said plurality of repeating arrangements includes at least two different spacings along said x-axis.

8. The mechanical fastener of claim 7, wherein the x-distance between adjacent of said plurality of repeating arrangements is in a pattern of A-B-C-B.

9. The mechanical fastener of claim 6, wherein said plurality of repeating arrangements are ordered relative to one another along said y-axis.

10. The mechanical fastener of claim 1, wherein said plurality of repeating arrangements are ordered relative to one another along said y-axis.

11. The mechanical fastener of claim 1, wherein said fastener is an interengaging mechanical fastener.

12. A mechanical fastener, comprising:
    a) a substrate; and
    b) a plurality of engaging stems extending from said substrate, wherein said stems are arranged in a plurality of repeating arrangements, wherein said stems within each of said arrangements are unordered, wherein said fastener includes an x-axis and a y-axis which are mutually perpendicular to each other, and wherein said engaging stems within said arrangements are ordered relative to one another along said y-axis.

13. The mechanical fastener of claim 12, wherein adjacent of said plurality of engaging stems have a spacing along said y-axis in a pattern of a-a-b.

14. The mechanical fastener of claim 13, wherein a is less than b.

15. The mechanical fastener of claim 12, wherein said plurality of repeating arrangements are ordered relative to one another along said x-axis.

16. The mechanical fastener of claim 15, wherein the x-distance between adjacent of said plurality of repeating arrangements includes at least two different spacings along said x-axis.

17. The mechanical fastener of claim 16, wherein the x-distance between adjacent of said plurality of repeating arrangements is in a pattern of A-B-C-B.

18. The mechanical fastener of claim 12, wherein said plurality of repeating arrangements are ordered relative to one another along said y-axis.

19. The mechanical fastener of claim 12, wherein said fastener is an interengaging mechanical fastener.

20. A mechanical fastener, comprising:
    a) a substrate; and
    b) a plurality of engaging stems extending from said substrate, wherein said stems are arranged in a plurality of repeating arrangements, wherein said fastener includes an x-axis and a y-axis which are mutually perpendicular to each other, wherein said plurality of repeating arrangements are ordered relative to one another along said x-axis, wherein the x-distance between adjacent of said plurality of repeating arrangements includes at least two different spacings along said x-axis.

21. The mechanical fastener of claim 20, wherein the x-distance between adjacent of said plurality of repeating arrangements includes at least three different x-distances.

22. The mechanical fastener of claim 21, wherein the x-distance between adjacent of said plurality of repeating arrangements is in a pattern of A-B-C-B.

23. The mechanical fastener of claim 22, wherein A is greater than B.

24. The mechanical fastener of claim 22, wherein the B is greater than C.

25. The mechanical fastener of claim 20, wherein said plurality of repeating arrangements are ordered relative to one another along said y-axis.

26. The mechanical fastener of claim 20, wherein said arrangements repeat in more than one direction.

27. The mechanical fastener of claim 20, wherein said engaging stems within said arrangements are unordered.

28. The mechanical fastener of claim 20, wherein said engaging stems within said arrangements are ordered relative to one another along said y-axis.

29. The mechanical fastener of claim 20, wherein said engaging stems within said arrangements are ordered relative to one another along said x-axis.

30. The mechanical fastener of claim 20, wherein said fastener is an interengaging mechanical fastener.

31. A pair of interengaging mechanical fasteners, comprising:
   a) a substrate; and
   b) a plurality of engaging stems extending from said substrate, wherein said stems are arranged in a plurality of repeating arrangements, each of said arrangements having an unordered pattern of said stems, wherein said stems within each of said arrangements are positioned in said unordered pattern, and wherein said fasteners includes an x-axis and a y-axis which are mutually perpendicular to each other.

32. The mechanical fasteners of claim 31, wherein said engaging stems within said arrangements are ordered relative to one another along said x-axis.

33. The mechanical fasteners of claim 31, wherein said engaging stems within said arrangements are ordered relative to one another along said y-axis.

34. The mechanical fasteners of claim 33, wherein adjacent of said plurality of engaging stems in said arrangements have a spacing along said y-axis in a pattern of a-a-b.

35. The mechanical fasteners of claim 34, wherein a is less than b.

36. The mechanical fasteners of claim 31, wherein said plurality of repeating arrangements are ordered relative to one another along said x-axis.

37. The mechanical fasteners of claim 36, wherein the x-distance between adjacent of said plurality of repeating arrangements includes at least two different spacings along said x-axis.

38. The mechanical fasteners of claim 37, wherein the x-distance between adjacent of said plurality of repeating arrangements is in a pattern of A-B-C-B.

39. The mechanical fasteners of claim 31, wherein said plurality of repeating arrangements are ordered relative to one another along said y-axis.

40. The mechanical fasteners of claim 31, wherein said arrangements repeat in more than one direction.

* * * * *